United States Patent
Olea et al.

(10) Patent No.: US 9,455,633 B2
(45) Date of Patent: Sep. 27, 2016

(54) METHOD AND APPARATUS FOR CONTROLLING A FREQUENCY CONVERTER

(71) Applicant: INGETEAM POWER TECHNOLOGY, S.A., Zamudio (Bizkaia) (ES)

(72) Inventors: Eneko Olea, Zamudio (ES); Josu Ruiz, Zamudio (ES); Josu Elorriaga, Zamudio (ES); Sergio Aurtenetxea, Newtown (GB); Ainhoa Carcar, Sarriguren (ES); Beatriz Gil, Sarriguren (ES)

(73) Assignee: INGETEAM POWER TECHNOLOGY, S.A., Zamudio (ES)

( * ) Notice: Subject to any disclaimer, the term of this patent is extended or adjusted under 35 U.S.C. 154(b) by 825 days.

(21) Appl. No.: 13/683,054

(22) Filed: Nov. 21, 2012

(65) Prior Publication Data

US 2013/0176751 A1    Jul. 11, 2013

Related U.S. Application Data (60) Provisional application No. 61/583,449, filed on Jan. 5, 2012.

(51) Int. Cl.
*H02J 3/24* (2006.01)
*H02M 3/335* (2006.01)
(Continued)

(52) U.S. Cl.
CPC ............ *H02M 3/335* (2013.01); *H02J 3/1842* (2013.01); *H02J 3/24* (2013.01); *H02J 3/386* (2013.01); *H02J 3/48* (2013.01); *H02P 9/007* (2013.01); *H02P 9/105* (2013.01); *Y02E 10/763* (2013.01)

(58) Field of Classification Search
CPC ........ H02J 3/24; H02J 3/1807; H02J 3/1814; H02J 3/00; H02J 3/1842; H02J 3/386; H02J 3/01; H02J 3/06; H02J 3/32; H02J 9/062; H02J 13/0075; H02J 2003/388; H02J 3/1835; H02J 3/36; H02J 3/385
USPC ........................................................ 307/102
See application file for complete search history.

(56) References Cited

U.S. PATENT DOCUMENTS 5,227,713 A    7/1993    Bowler et al.
5,343,139 A    8/1994    Gyugyi et al.
(Continued)

FOREIGN PATENT DOCUMENTS

EP       2 317 134 A2       5/2011
WO    20110112571 A2    9/2011

OTHER PUBLICATIONS

International Search Report and Written Opinion, dated Jun. 27, 2013, issued in International Application No. PCT/IB2012/0002978.

(Continued)

*Primary Examiner* — Jared Fureman
*Assistant Examiner* — Esayas Yeshaw
(74) *Attorney, Agent, or Firm* — Sughrue Mion, PLLC (57) ABSTRACT

An apparatus and method of controlling a frequency converter is provided. First, subsynchronous components in the electrical grid are identified using voltage measurements of the electrical grid. The subsynchronous components of the electrical grid are then used to determine set points for damping currents. These damping currents are then added to current set points calculated by power regulation loops to generate total current set points. Thereafter, the frequency converter is controlled based on the total current set points.

12 Claims, 11 Drawing Sheets

(51) Int. Cl.
*H02J 3/38* (2006.01)
*H02P 9/10* (2006.01)
*H02J 3/48* (2006.01)
*H02P 9/00* (2006.01)
*H02J 3/18* (2006.01)

(56) References Cited

U.S. PATENT DOCUMENTS

| | | | | |
|---|---|---|---|---|
| 8,310,074 | B2* | 11/2012 | Larsen | F03D 9/003 290/44 |
| 2009/0167095 | A1* | 7/2009 | Rivas | F03D 7/0224 307/87 |
| 2011/0101689 | A1* | 5/2011 | Larsen | F03D 9/003 290/44 |
| 2012/0139243 | A1* | 6/2012 | Koerber | F03D 7/0284 290/44 |
| 2012/0292904 | A1* | 11/2012 | Tarnowski | H02J 3/386 290/44 |
| 2013/0010505 | A1* | 1/2013 | Bo | H02J 3/386 363/37 |

OTHER PUBLICATIONS

Sub-Synchronous Grid Conditions: New Event, New Problem, and New Solutions authored by Lawrence C. Gross, Jr. (presented Oct. 2010).

* cited by examiner

METHOD AND APPARATUS FOR CONTROLLING A FREQUENCY CONVERTER

CROSS-REFERENCE TO RELATED PATENT APPLICATION

This application claims priority from U.S. Provisional Patent Application No. 61/583,449 filed on Jan. 5, 2012 in the U.S. Patent Trademark Office, the disclosure of which is incorporated herein in its entirety by reference.

BACKGROUND OF THE INVENTION

1. Field of the Invention

Apparatuses and methods consistent with the present invention relate to a frequency converter utilized in a wind turbine generator.

2. Description of the Related Art

Power grids are the part of a power supply system and have the components necessary to transfer the electric power generated by power generating units across long distances to points of power consumption. Most power grids installed today carry energy as an alternating voltage and current. It is worth highlighting that the number of power grids carrying energy as continuous voltage and current (DC) is increasing due to the advantages they offer in terms of energy efficiency in long-distance grids. This has been possible due to the progress in conversion systems based on power electronics, which allow interconnecting the two types of grids, alternating power grids and continuous power grids, by using HVDC (High Voltage Direct Current) and HVAC (High Voltage Alternating Current) conversion structures.

Similarly, the progress experienced in power electronics is favoring a change in a new direction towards a distributed generation structure and away from the basic generation structure used until now, which has been based mainly on large thermal, hydraulic or nuclear power stations. One of the key elements in the growing structure of distributed generation is wind power, which in the last decade has experienced large growth by way of new installations of wind power generators. Wind power generation relies on power electronics, since most of the generators used to convert the mechanical power of wind into electric power injected into the grid are controlled by conversion structures based on power electronics, especially components known as frequency converters.

Frequency converters are controlled from control units that perform control based mainly on information captured using current and voltage transducers, and by running control algorithms to control the power flow between two electrical systems. There are different kinds of electrical systems, such as power grids or electrical machines, and the power flow can be bidirectional. For example, if the energy is consumed from the power grid in order to be transformed into mechanical energy in the shaft of an electric machine, the application will correspond to a motor application (for example, pumping or ventilation applications). In contrast, if the energy is extracted from an electric machine and injected into the power grid, the application will correspond to a generation application (for example, wind generation applications, where the primary power source is the wind, which turns the shaft of the electric machine).

Alternating power grids consist mainly of cables (the physical medium through which energy flows) and voltage transformers (components that allow adapting voltage levels between different connection points). Both components, cables and transformers, are components having a mainly inductive nature, and therefore, provide inductive impedance to the alternating current circulating through them. Depending on the characteristics of each power grid, the existing inductive impedance will vary, the length of the cables in the grid being an important parameter to consider when quantifying the value of inductive impedance (the greater the length, the greater the grid inductance and therefore the greater the inductive impedance). The existence of high inductive impedance in a power grid will mean a greater loss in its transmission capacity. This phenomenon is due to the voltage drop that occurs in the inductive impedance of the cable when current circulates through it, and it can become important in certain cases that combine factors such as long lengths of cable and high power consumption (high circulation of current through the power grid).

In the related art, there exist some solutions to the aforementioned problem of a loss of transmission capacity in power grids having a high inductive impedance. One of the commonly applied solutions relies on the compensation of the highly inductive power grids by inserting capacitive components (condensers) in series. This functions to compensate for the inductive impedance of the power grid itself by inserting series capacitive impedance, resulting in the reduction of the total equivalent impedance. This technique minimizes the problem of voltage drops in the power grid and therefore contributes to maintaining its capacity for power transmission.

Inserting series capacitors in highly inductive power grids is effective when solving the problem of the loss of transmission capacity of a grid, but in turn, results in problematic effects when considered from the point of view of the stability of the compensated power grid. Specifically, the insertion of series capacitors within an inductive grid results in the equivalent circuit of that grid having a natural resonant frequency according to the formula described by:

$$f_R = f_0 \sqrt{\frac{X_C}{X_L}} \qquad \text{Equation (1)}$$

Figure 2:
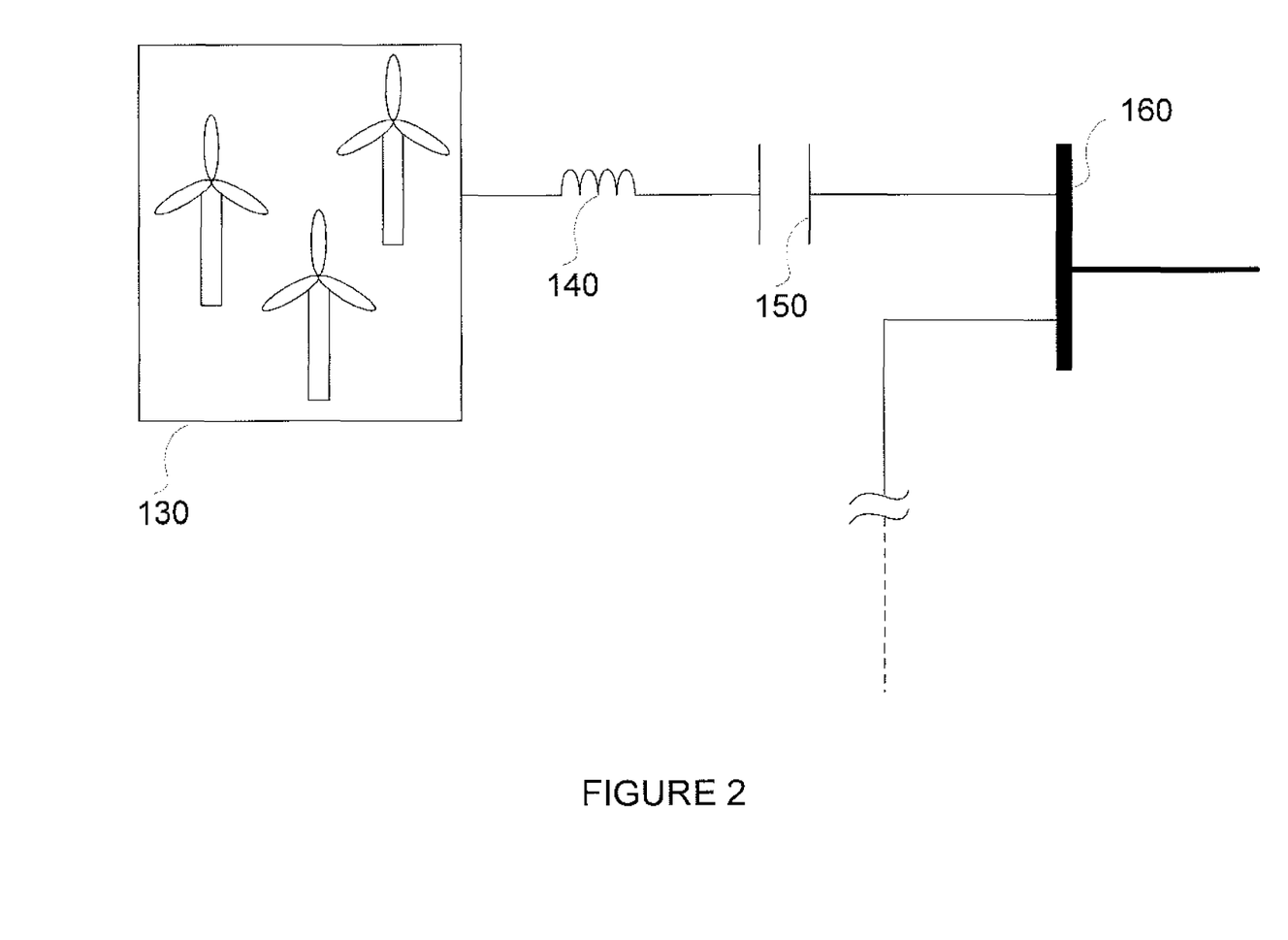
FIG. 2 shows a single-line wire diagram for a power grid compensated with series capacitors.

Wherein:

$f_R$—Natural resonant frequency of the compensated grid
$f_0$—Base frequency of the power grid
$X_C$—Capacitive impedance of the series condenser inserted in the power grid
$X_L$—Inductive impedance of the power grid FIG. 2 shows a single-line wire diagram for a power grid compensated with series capacitors. The different components making up the power grid are: the central power generation unit 13 shown in the figure as a wind farm; the equivalent inductance 14 of the transmission lines or power grid cables; the condensers introduced in series in the power grid to compensate for the equivalent inductance of the power grid; and the collectors 15 present in the power grid that join the transmission lines from different points.

Depending on the degree of compensation applied to the power grid (percentage of capacitive impedance as series capacitors with respect to the inductive impedance of the power grid itself), the resulting value of the resonant frequency of the power grid will vary. The ratio of capacitive and inductive impedances commonly applied in power grid compensation usually results in resonant frequency values lower than the grid's base frequency. The technical literature uses the term SSI (Sub Synchronous Interactions) to describe the condition of a power grid having these features.

Grids with subsynchronous resonance are potentially dangerous grids for integrating generation components that are based on generation turbines with rotary shafts having a low-frequency mechanic oscillation. This is the case of synchronous generators with long shafts (typical example of generation plants) in which the distribution of mass along the shaft that in turn rotates by the action of a primary torque source (steam, water, etc.), commonly exhibit mechanical oscillation modes with frequencies of less than the base frequency of the power grid to which they are connected. In the event that the grid connected to a generator with the features mentioned above is compensated with a specific value of series capacitors that make the natural subsynchronous resonant frequency coincide with the oscillation frequency of the mechanical shaft, negative effects may be inducted on the shaft, since the amplitude of the mechanical oscillation of the shaft could be amplified with a negative damping (that is, an oscillation of increasing amplitude over time). This effect could result in a failure of the generator shaft. This case corresponds to a problem specific to the natural interaction between two parts of a power system, the power grid adjusted with capacitors and the generator, where the mechanical mass of a synchronous generator resonates with the subsynchronous frequency of the grid equivalent impedance of the power grid. This phenomenon is known in the technical literature as SSR (Subsynchronous Resonance).

In addition to the possibility of the natural resonant frequency of a compensated power grid coinciding with the natural mechanical resonant frequency of generators injecting power into that grid, the growing presence of frequency converters connected to the grid adds a new aspect to be considered from the point of view of grid stability. This is the interaction of frequency converter controls with compensated grids, a phenomenon that can cause the loss of control of the flow of energy through the converter, which may destabilize the power grid itself. This phenomenon is known in the literature as SSCI (Subsynchronous Control Instability).

The SSCI phenomenon occurs when control of the frequency converters connected to compensated grids having series capacitors makes the converters behave as electrical systems whose equivalent resistance acquires negative values within a frequency range of less than the grid base frequency. The SSCI phenomenon may have similar effects to those of the SSR phenomenon, but to achieve this there must be a high number of frequency converters connected to compensated grids. The increasing use of frequency converters connected to the grid, together with the existence of power grids compensated with series capacitors, have made this potentially hazardous scenario become a reality, for which a solution is desired and which forms a basis for the invention disclosed herein.

SUMMARY OF THE INVENTION

Aspects of the invention relate to a method for controlling a frequency converter connected to the power grid, characterized in that it contributes to damping the subsynchronous resonance that may occur in the power grid. The control method is based on the reading of the voltage from the grid to which the frequency converter is connected. Voltage readings are used to identify the resonant frequencies existing in the grid and are also used within the regulation loops of the frequency converter in order to establish the current set points that the converter must regulate in order to dampen the subsynchronous resonance in the power grid.

The control method proposed may be implemented in existing systems, since this is an improvement that may be applied to the software operating in the control unit governing the converter, and could therefore may be applied by updating the control program used in the central control unit.

BRIEF DESCRIPTION OF THE DRAWINGS

The above and other aspects and features of the various aspects of the present invention will become more apparent by describing in detail exemplary embodiments thereof with reference to the attached drawings in which.

DETAILED DESCRIPTION OF THE EXEMPLARY EMBODIMENTS

The detailed description of the various aspects of the invention will be developed based on a doubly-fed topology power generation application. A person skilled in the art might understand that the invention described is applicable to any application including at least one frequency converter connected to the grid. As proof of the above, examples such as power generation or consumption applications can be cited in which all of the energy flows through the frequency converter (full converter), HVDC applications for power distribution or HVAC applications for power distribution.

The doubly-fed topology consists of a doubly-fed asynchronous generator wherein the stator terminals are connected directly to the power grid and wherein the rotor terminals are connected to a frequency converter that is in turn connected to the power grid.

Figure 1:
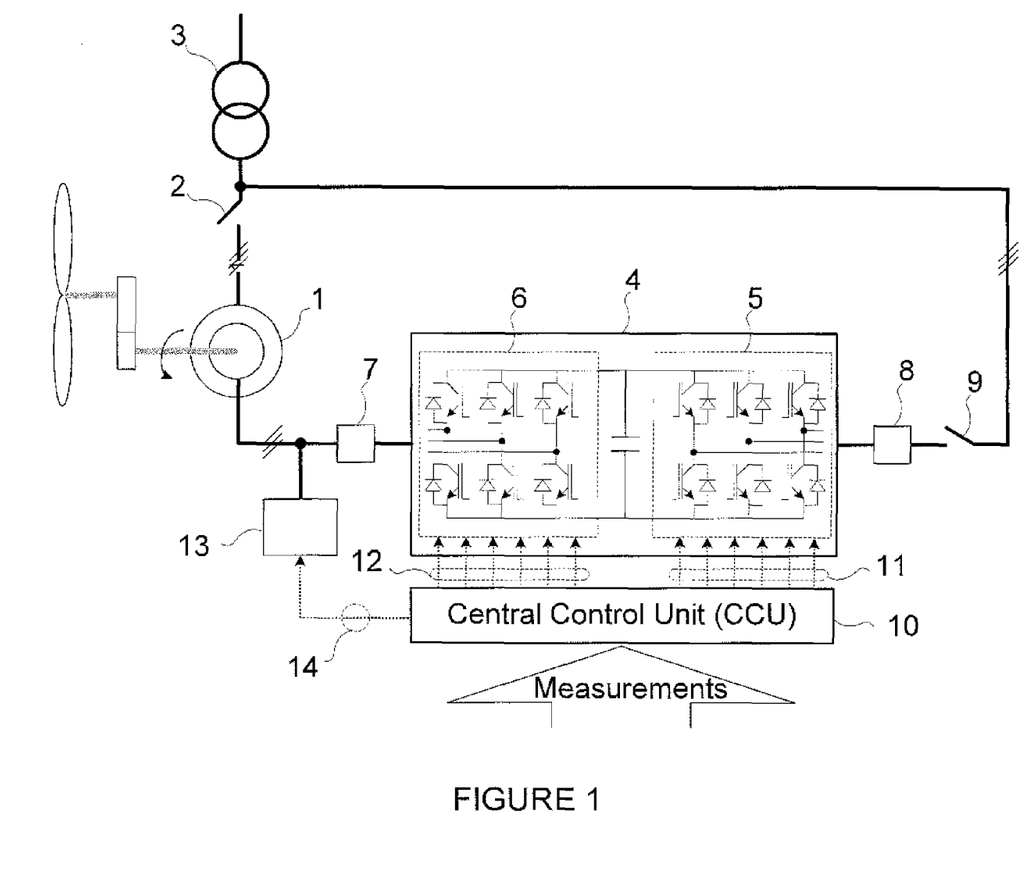
FIG. 1 shows a single-line wire diagram of a wind power application based on a doubly-fed topology.

FIG. 1 shows a single-line wire diagram of a wind power application based on a doubly-fed topology. The diagram shows the different parts the application consists in, including the header transformer that adapts the supply voltage, the wound rotor asynchronous generator 1, the frequency converter 4 consisting of the inverter 6 and the rectifier 5, the shunt protection circuit 13, the grid connection filter 8 and the generator connection filter 7, the central control unit 10, the contactor for connection to the grid-side generator 2 and the contactor 9 for connecting the rectifier 5 to the grid.

More specifically, FIG. 1 shows a system including a doubly-fed asynchronous generator 1, whose stator is connected to the power grid via the stator coupling contactor 2 and a transformer 3. The transformer 3 adapts the voltage output of the stator to the voltage level of the power grid. The rotor of the double-fed synchronous generator 1 is connected to a frequency converter 4 consisting of a grid-side converter or rectifier 5 and a machine-side converter or inverter 6. The system also includes a generator connection filter 7 between the inverter 6 and the rotor as well as a grid connection filter 8 connected between the rectifier 5 and the connection contactor 9 for connecting the rectifier to the power grid.

The system further includes a central control unit 10 that runs the control algorithms from measurements taken from the system in order to generate switching commands 11 of the static switches of the rectifier and to generate switching commands 12 for the static switches of the inverter.

In an embodiment, the inverter 6 and the rectifier 5 may include static switches of the IGBT type, with their opening and closing governed by switching commands from the central control unit 10.

The grid connection filter 8 and generator connection filter 7 may consist of passive components such as inductances, capacitances and/or resistors. The main purpose of the grid connection filter 8 is the filtering of voltage and current waves in order to reduce the harmonic content of the power that is injected into the grid. The main purpose of the generator connection filter 7 is to moderate the derivatives of the voltage waves imposed by the inverter on the generator rotor coils.

Operation of the assembly is monitored from the central control unit 10, which processes measurements collected from sensors installed throughout the system. The central control unit 10 runs the programmed control algorithms in order to control the power flow between the generator and the grid. As a result of running these algorithms, switching commands 11 and 12 are generated for the IGBTs installed in both the rectifier 5 and in the inverter 6. These switching commands 11, 12 are calculated using modulation steps that use pulse width modulation techniques to synthesize from the continuous stage voltages, reference voltages that must be applied at the output of the inverter 6 and the rectifier 5 to control the currents in each of these components. Pulse width modulation methods are widely used in the current state of the art, and can vary between scalar or vector methods. Scalar modulation methods are those based on the comparison of carrier signals with modulating signals (PWM, Pulse Width Modulation, for example). Vector methods are those that apply specific vectors or switching patterns at specific times calculated previously in the modulation stages (SVPWM, Space Vector Pulse Width Modulation, for example).

FIG. 2 shows a single line diagram representing in a simplified manner a power distribution line that interconnects a wind generation plant 130 with a power collector 160 that is used to connect different power distribution lines. The inductance 140 represents the inductive nature of the power distribution line connected to the wind generation plant 130. The power distribution line that interconnects the wind generation plant 130 and the power collector 160 is compensated by introducing a capacitor 150 placed in series connection.

Figure 3:
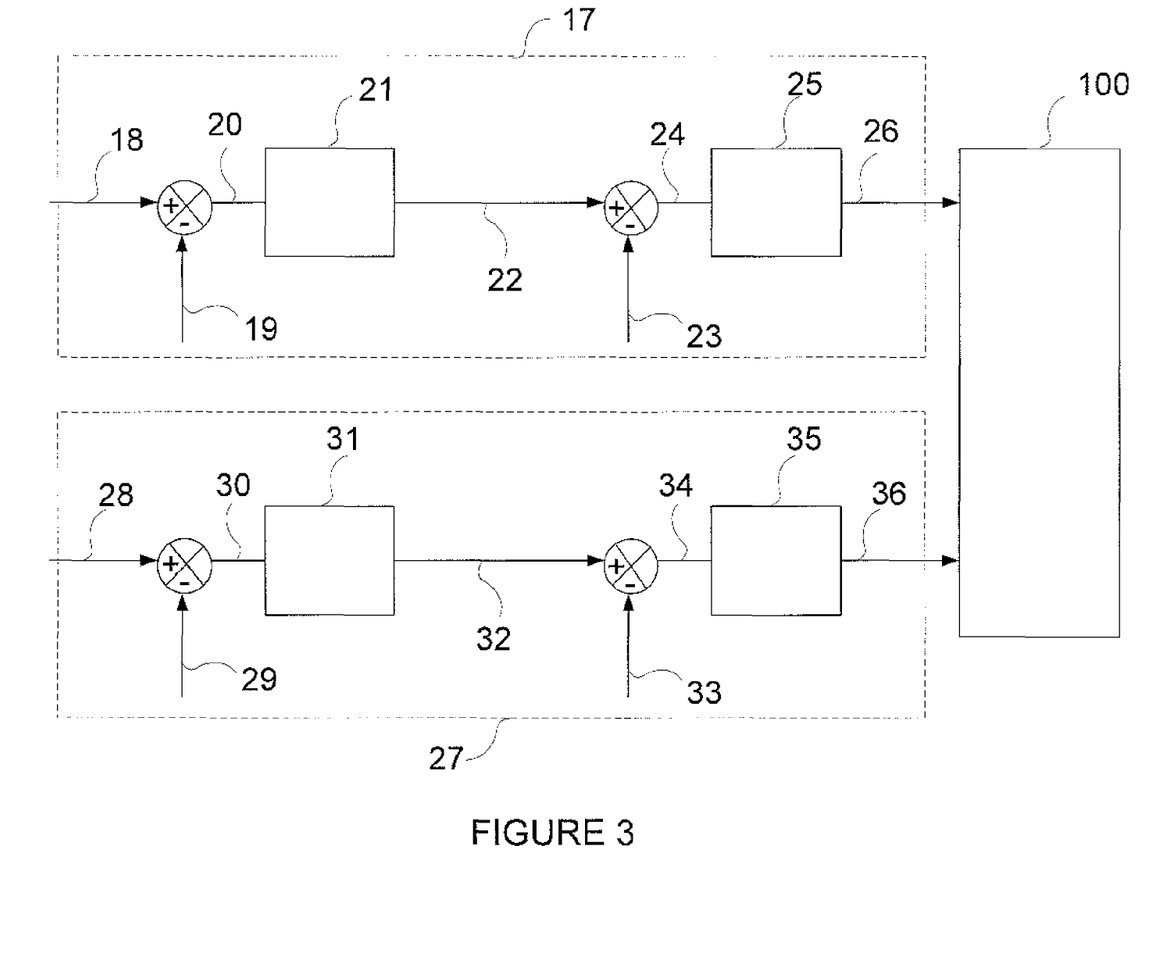
FIG. 3 shows a block diagram representing the active power regulation loop (17) and the reactive power regulation loop (27).

FIG. 3 shows that the control algorithms govern a power regulation loop (known as the external loop) and a current regulation loop (known as the inner loop). As shown in FIG. 3, the structure consisting of the two regulation loops is equivalent both for the active power 17 and for the reactive power 27. The active power regulation loop 17 is based on the comparison of an active power set point 18 with the actual value of the active power measured in the system 19. The error 20 resulting from the comparison will be processed by the active power regulator 21, which shall provide the necessary active current output set point 22 to be regulated by the subsequent active current loop. The inner active current regulation loop shall receive the active current set point 22 imposed at the output of the active power regulator 21 and will compare this value with the real value of the active current measured in the system 23. The error 24 resulting from the comparison between both current values will be processed by the active current regulator 25, which shall provide the necessary active voltage output set points 26 to be imposed at the converter output via the static switch triggering commands imposed by the modulation stage 100.

Similarly to what has been described for the active power regulation loop, the operating principle for the reactive power loop 27 is based on the comparison of a reactive power set point 28 that will be compared to the actual value of reactive power 29 measured in the system. The error 30 resulting from the comparison will be processed by the reactive power regulator 31 that will provide the necessary reactive current output set point 32 to be regulated by the subsequent reactive current loop. The inner active current regulation loop shall receive the reactive current set point 32 imposed at the output of the reactive power regulator 31 and will compare this value with the real value of the reactive current measured in the system 33. The error 34 resulting from the comparison between both current values will be processed by the reactive current regulator 35, which shall provide the necessary reactive voltage output set points 36 to be imposed at the converter output via the static switch triggering commands imposed by the modulation stage 100.

The active voltage 26 and reactive voltage 36 set points will be processed by the modulation stage 100, which shall define the switching commands 11, 12 for the static switches of the converter.

Figure 4:
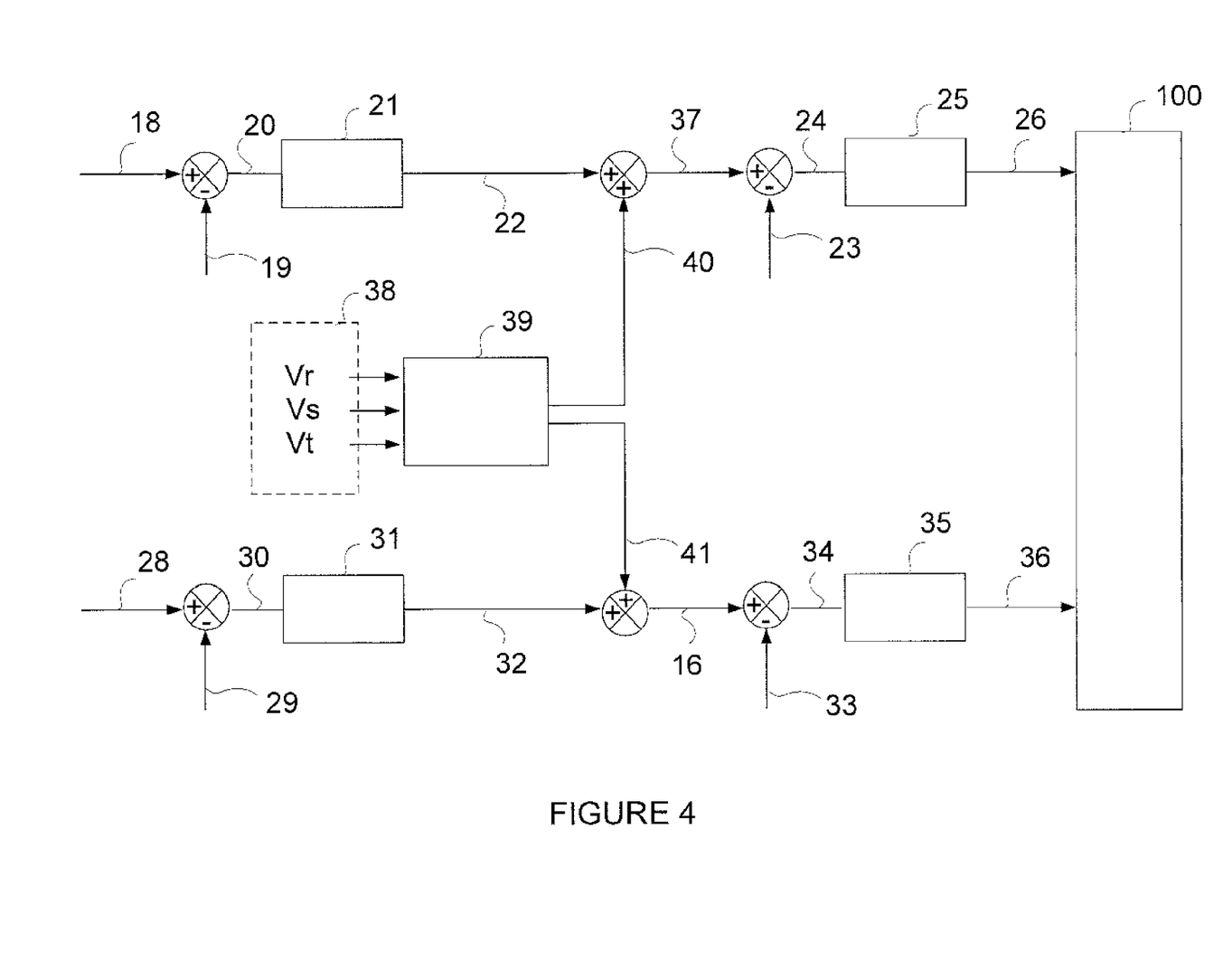
FIG. 4 shows a block diagram representing the modified active power and reactive power regulation loops integrating the subsynchronous resonance damping loop (39).
Figure 5:
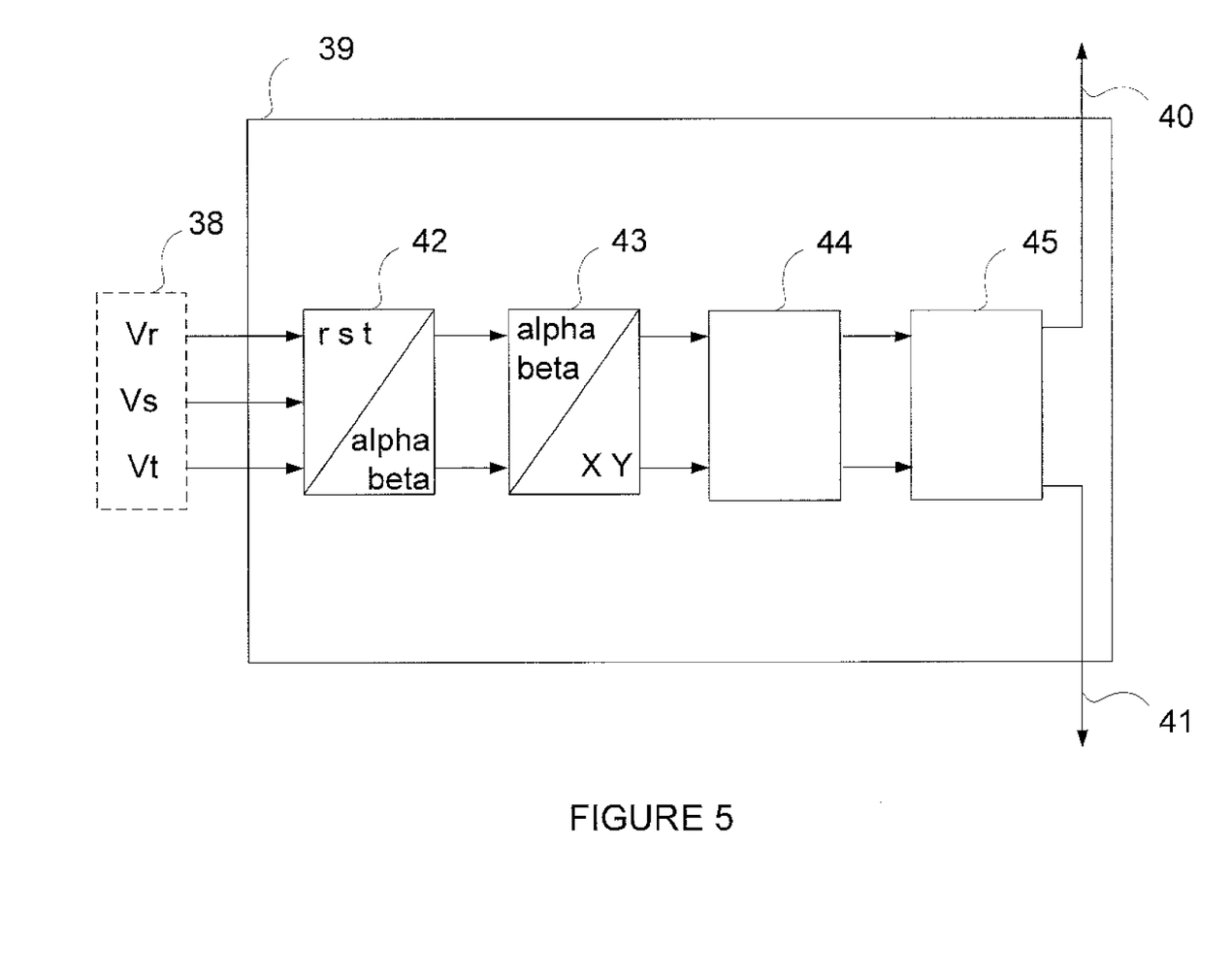
FIG. 5 shows a block diagram describing the subsynchronous resonance damping loop (39).
Figure 7:
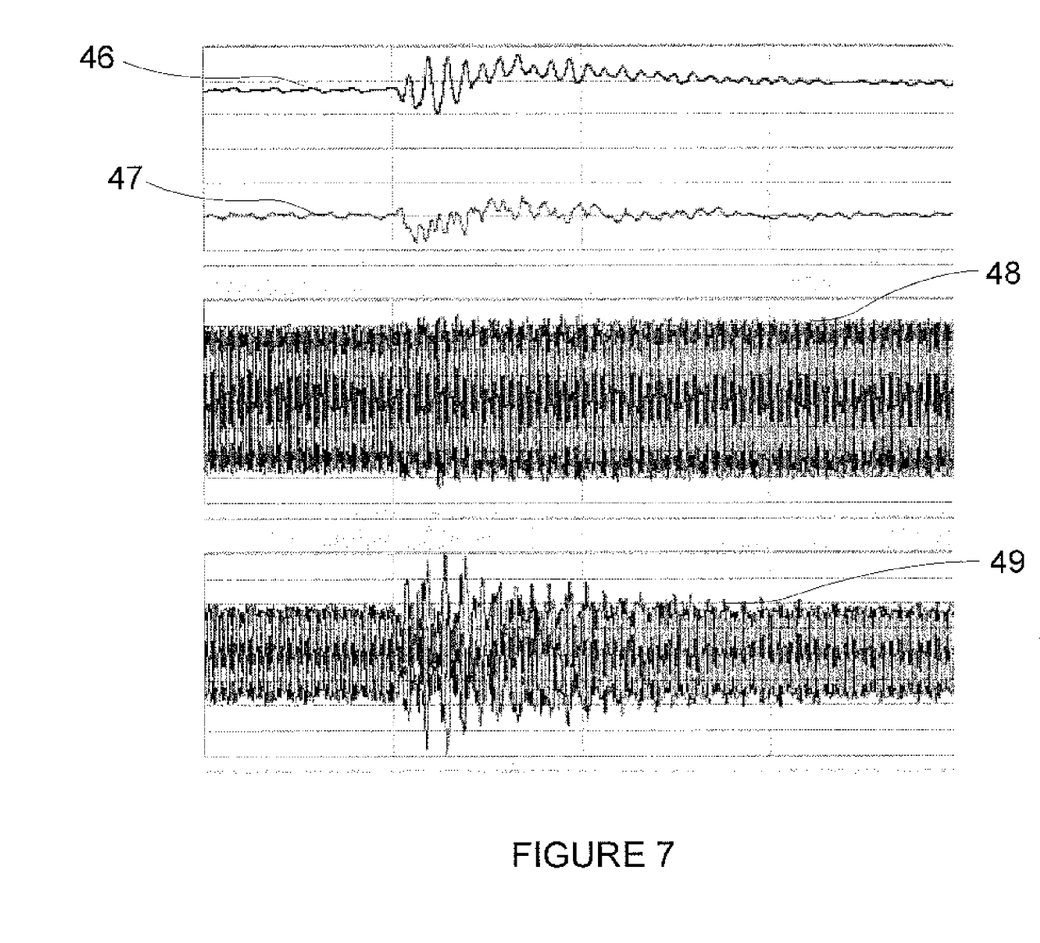
FIG. 7 shows the results from a simulation of a wind power generation software based on a doubly-fed topology controlled by a frequency converter the operation of which is regulated by the regulation algorithm defined in FIG. 4.
Figure 7A:
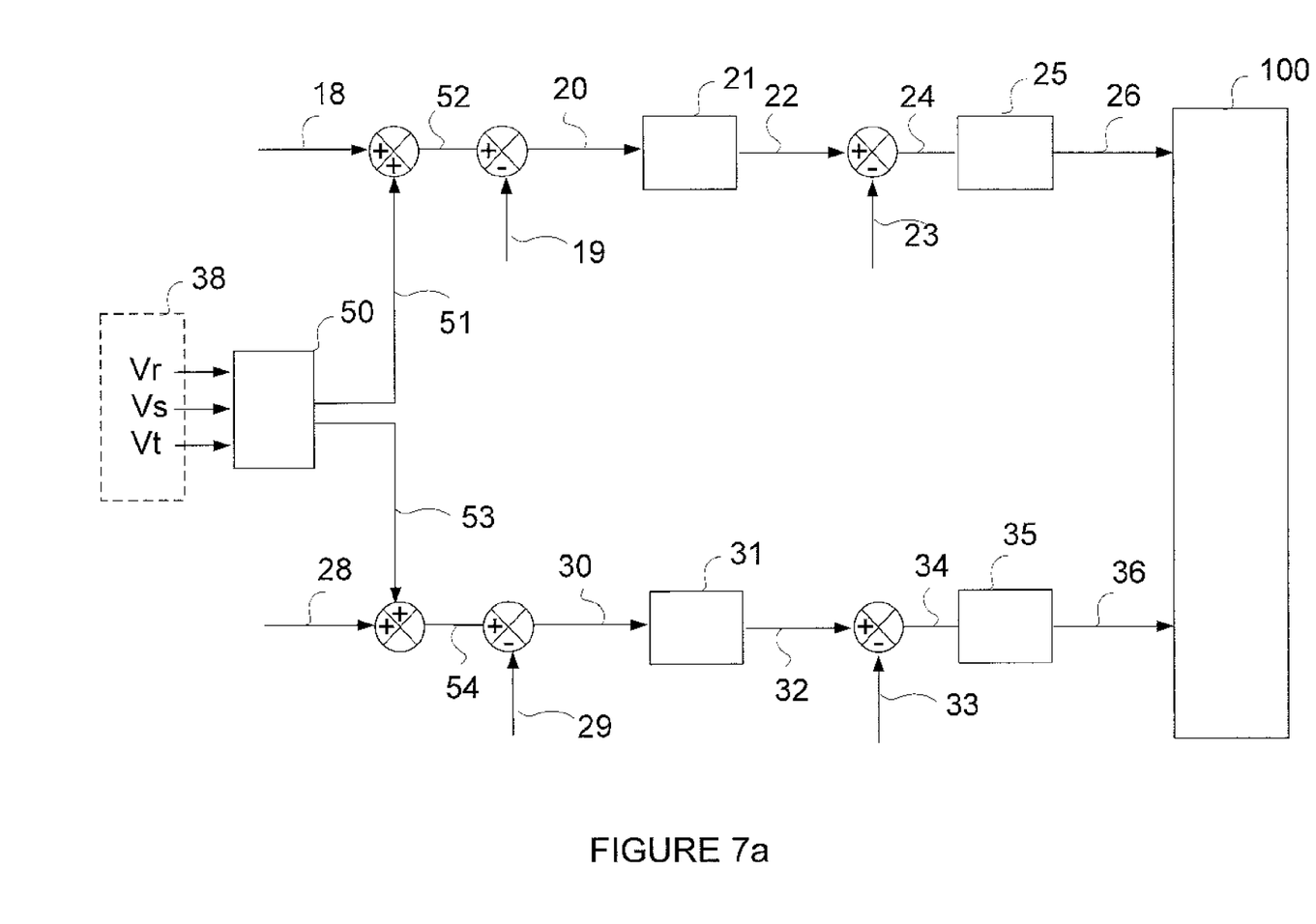
FIG. 7a shows a system including a grid subsynchronous resonance damping loop based on power set points 50.

This invention proposes modifying the regulation algorithms described in FIG. 3, completing them by including a new grid subsynchronous resonance damping loop based on current set points 39 (FIG. 4) or a new grid subsynchronous resonance damping loop based on power set points 50 (FIG. 7a). As shown in FIG. 4, subsynchronous resonance damping loop based on current set points 39 is based on the readings of grid voltages 38 that, once processed, will determine the necessary current set points to dampen the subsynchronous resonance of the grid. As shown in FIG. 7a, subsynchronous resonance damping loop based on power set points 50 is based on the readings of grid voltages 38 that, once processed, will determine the necessary power set points to dampen the subsynchronous resonance of the grid As shown in FIG. 5, the subsynchronous resonance damping loop based on current set points 39 will process the readings of grid voltages 38 by applying mathematical operations such as Clarke transformations 42 and Park transformations 43. The application of these two transformations provides a vector representation of power grid voltages. The vector representation of power grid voltages will be used by the voltage subsynchronous component identification block 44 using filters that allow differentiating the base frequency of the power grid from any other frequencies that may be present, i.e., subsynchronous frequencies. Adjustments to the filters used to identify the subsynchronous components of the grid voltage will be predefined by default in order to identify the subsynchronous components of the voltage of any power grid to which the frequency converter is connected without having to know the theoretical subsynchronous resonance value corresponding to such grid, which value could be identified if the natural impedance values of the power grid are known. A person skilled in the art can determine the natural impedances of a power grid if the components making up such power grid are known.

The subsynchronous components of the power grid identified by the subsynchronous resonance identification block 44 shall be used in the current damping set point calculation block 45 in order to generate damping current set points that will be added to the current set points imposed by the active and reactive power loops. The damping set points calculated by the current damping set point calculation block 45 shall be split into active 40 and reactive 41 components.

The active damping current set point 40 shall be added to the active current set point 22 calculated by the active power regulator 21 and the result of this addition shall correspond to the total active current 37 that the active current regulator 25 must regulate. Similarly, the reactive damping current set point 41 shall be added to the reactive current set point 32 calculated by the reactive power regulator 31 and the result of this addition shall correspond to the total reactive current that the reactive current regulator 35 must regulate.

Figure 7B:
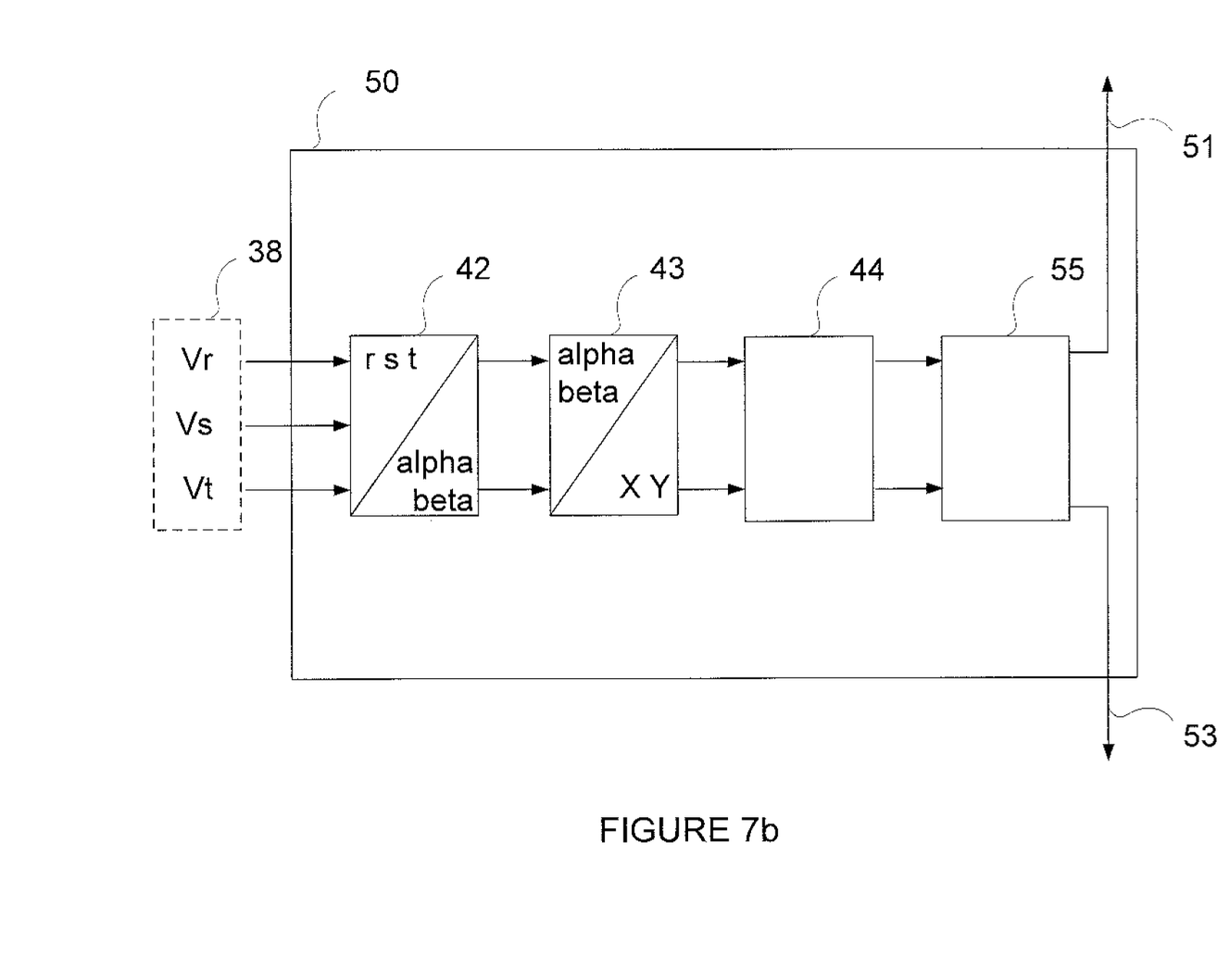
FIG. 7b shows the subsynchronous resonance damping loop based on power set points 50

As shown in FIG. 7b, the subsynchronous resonance damping loop based on power set points 50 will process the readings of grid voltages 38 by applying mathematical operations such as Clarke transformations 42 and Park transformations 43. The application of these two transformations provides a vector representation of power grid voltages. The vector representation of power grid voltages will be used by the voltage subsynchronous component identification block 44 using filters that allow differentiating the base frequency of the power grid from any other frequencies that may be present, i.e., subsynchronous frequencies. Adjustments to the filters used to identify the subsynchronous components of the grid voltage will be predefined by default in order to identify the subsynchronous components of the voltage of any power grid to which the frequency converter is connected without having to know the theoretical subsynchronous resonance value corresponding to such grid, which value could be identified if the natural impedance values of the power grid are known. A person skilled in the art can determine the natural impedances of a power grid if the components making up such power grid are known.

The subsynchronous components of the power grid identified by the subsynchronous resonance identification block 44 shall be used in the power damping set point calculation block 55 in order to generate damping power set points that will be added to the power set points, active power set point 18 and reactive power set point 28. The damping set points calculated by the power damping set point calculation block 55 shall be split into active 51 and reactive 53 components.

The active damping power set point 51 shall be added to the active power set point 18 and the result of this addition shall correspond to the total active power 52 that the active power regulator 21 must regulate. Similarly, the reactive damping power set point 53 shall be added to the reactive power set point 28 and the result of this addition shall correspond to the total reactive power 54 that the reactive power regulator 31 must regulate.

Figure 6:
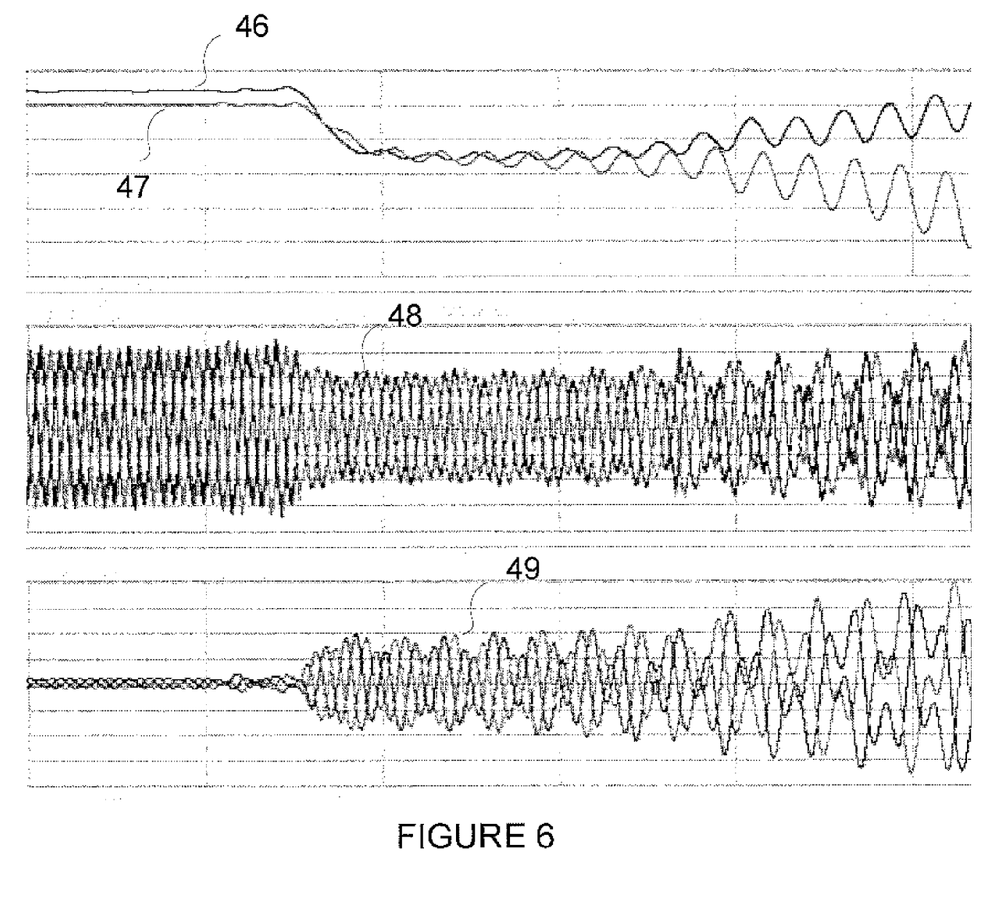
FIG. 6 shows the results from a simulation of a wind power generation software based on a doubly-fed topology controlled by a frequency converter the operation of which is regulated by the regulation algorithms defined in FIG. 3.

FIG. 6 shows the results from a simulation of a wind power generation software based on a doubly-fed topology controlled by a frequency converter the operation of which is regulated by the regulation algorithms defined in FIG. 3. The simulation shows the system's behavior in the event of a subsynchronous resonance appearing in the power grid. The simulation shows the shapes of the active power injected into the grid 46, the reactive power injected into the grid 47, the voltages of phases R, S and T of the power grid 48 and the currents of phases R, S and T of the power grid 49. The grid waveforms allow identifying the effect of the subsynchronous resonance on the grid voltages of phases R, S and T. The effect of the grid's subsynchronous resonance is that the control algorithms defined in FIG. 3 cannot control the active and reactive power and the currents R, S and T in the system.

FIG. 7 shows the results from a simulation of a wind power generation software based on a doubly-fed topology controlled by a frequency converter the operation of which is regulated by the regulation algorithm defined in FIG. 4. The simulation shows the system's behavior in the event of a subsynchronous resonance appearing in the power grid. The simulation shows the shapes of the active power injected into the grid 46, the reactive power injected into the grid 47, the voltages of phases R, S and T of the power grid 48 and the currents of phases R, S and T of the power grid 49. The waveforms shown in FIG. 7, compared to the waveforms of FIG. 6, allow verifying the improvement in system behavior operating with the control algorithms defined in FIG. 4. The effect of the subsynchronous resonance is dampened and the system maintains control of all its variables.

Figure 8:
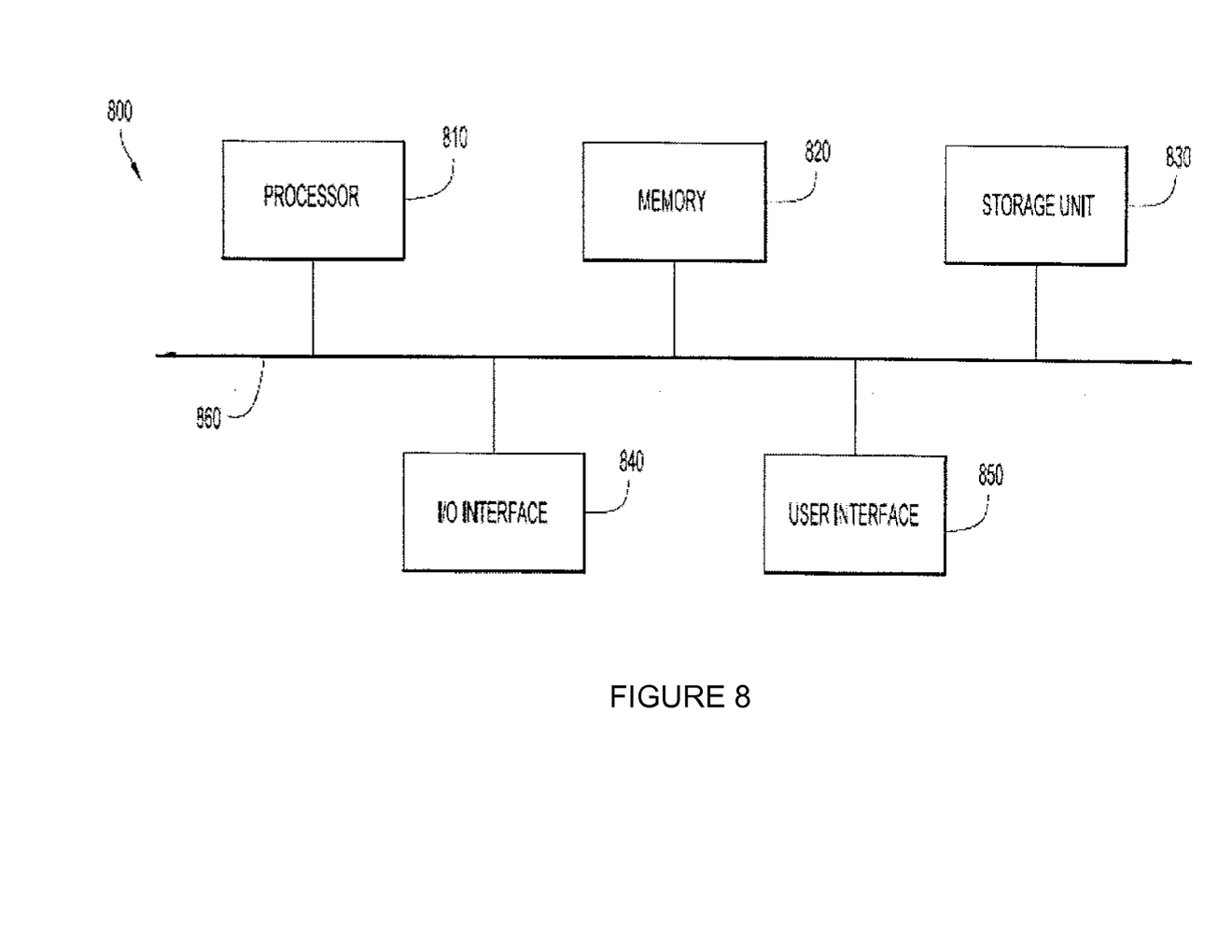
FIG. 8 is a diagram illustrating a system to which the embodiments of the present invention may be applied.

FIG. 8 is a diagram illustrating an embodiment of the central control unit 10 described above. Referring to FIG. 8, the system 800 may be a general purpose computer, special purpose computer, personal computer, server, or the like. The system 800 may include a processor 810, a memory 820, a storage unit 830, an I/O interface 840, a user interface 850, and a bus 860. The processor 810 may be a central processing unit (CPU), i.e. central control unit, that controls the operation of the system 800 by transmitting control signals and/or data over the bus 860 that communicably connects the elements 810 to 850 of the system 800 together. The bus 860 may be a control bus, a data bus, or the like. The processor 810 may be provided with instructions for implementing and controlling the operations of the system 800, for example, in the form of computer readable codes. The computer readable codes may be stored in the memory 820 or the storage unit 830. Alternatively, the computer readable codes may be received through the I/O interface 840 or the user interface 850. As discussed above, the memory 820 may include a RAM, a ROM, an EPROM, or Flash memory, or the like. As also discussed above, the storage unit 830 may include a hard disk drive (HDD), solid state drive, or the like. The storage unit 830 may store an operating system (OS) and application programs to be loaded into the memory 820 for execution by the processor 810. The I/O interface 840 performs data exchange between the system and other external devices, such as other systems or peripheral devices, directly or over a network, for example a LAN, WAN, or the Internet. The I/O interface 840 may include a universal serial bus (USB) port, a network interface card (NIC), Institution of Electronics and Electrical Engineers (IEEE) 1394 port, and the like. The user interface 850 receives input of a user and providing output to the user. The user interface 850 may include a mouse, keyboard, touchscreen, or other input device for receiving the user's input.

The user interface 850 may also include a display, such as a monitor or liquid crystal display (LCD), speakers, and the like for providing output to the user.

Figure 9:
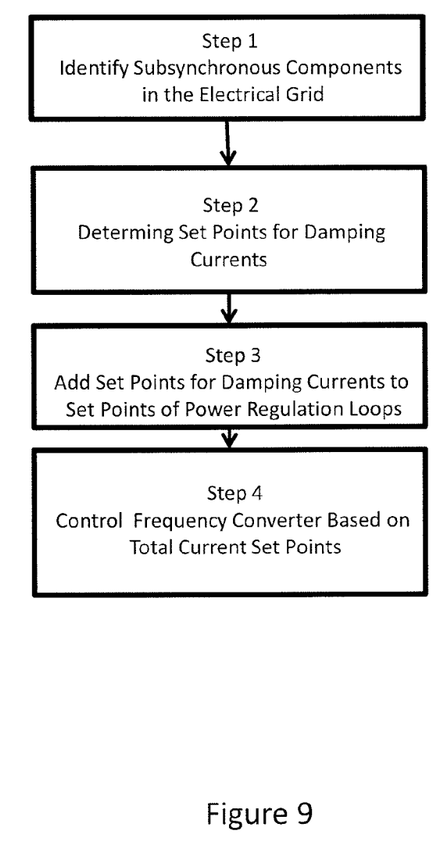
FIG. 9 is a flowchart showing a method in accord with an embodiment of the present invention.

FIG. 9 shows a flowchart describing the method according to this embodiment. The flowchart represents an algorithm that can be executed on the system shown in FIG. 8. In step 1, subsynchronous components leading to subsynchronous resonance on an electrical grid are identified. Based on the identified subsynchronous components, set points for damping currents are determined (step 2). These damping current set points are then added to the set points determined by the power regulation loops in step 3. Lastly, in step 4, the frequency converter is controlled based on the total current set points resulting from adding the damping current set points to the power regulation set points.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

The present invention has been described above with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

What is claimed is:

1. A method for controlling a frequency converter connected to a power grid, the method comprising:

determining an active current set point based on a comparison of measured active power output of the electrical generator with an active power set point;

determining a reactive current set point based on a comparison of measured reactive power output of the electrical generator with a reactive power set point;

identifying subsynchronous components in the electrical grid based on voltage measurements of the electrical grid;

determining damping currents set points using the subsynchronous components of the electrical grid;

adding the damping current set points to the current set points calculated by the comparison of measured active and reactive power outputs of the electrical generator with the active and reactive power set points to generate total current set points to dampen the sub synchronous resonance of the grid; and controlling the frequency converter based on the total current set points.

2. A method for controlling a frequency converter based on claim 1, wherein the damping current set points could be calculated from a damping power set point.

3. A method for controlling a frequency converter based on claim 1, wherein the identification of the subsynchronous components of the grid is performed using filters.

4. A method for controlling a frequency converter based on claim 1, wherein the set points for damping currents are calculated using regulators.

5. A method for controlling a frequency converter based on claim 4, wherein the regulators used to calculate the set points for damping currents can be proportional, proportional integral or proportional integral derivative regulators.

6. An electrical generating apparatus, the apparatus comprising:

an electrical generator configured to be connected to an electrical grid;

a converter comprising an inverter connected to a rotor of the electrical generator;

a control unit configured to control the converter based on an active power set point and a reactive power set point, the control unit comprising:

an active power control unit that determines an active current set point based on a comparison of measured active power output by the electrical generator with and the active power set point;

a reactive power control unit that determines an reactive current set point based on a comparison of measured reactive power output by the electrical generator with and the reactive power set point; and a subsynchronous resonance damping unit that determines subsynchronous components in the electrical grid based on voltage measurements of the electrical grid to determine damping set points for damping currents to dampen subsynchronous resonance of the grid, wherein the controller controls the converter based on the active current set point, the reactive current set point and the damping set points.

7. An electrical generating apparatus according to claim 6, wherein the subsynchronous resonance damping unit may determine damping current set points based on damping power set points.

8. The electrical generating apparatus according to claim 6, wherein the damping set points comprise an active damping current set point and a reactive damping current set point.

9. The electrical generating apparatus according to claim 6, wherein the subsynchronous resonance damping unit comprises a filter configured to differentiate a base frequency of the electrical grid from subsynchronous components of the electrical grid.

10. The electrical generating apparatus according to claim 9, wherein the subsynchronous resonance damping unit comprises a regulator to determine the damping set points for the damping currents.

11. The electrical generating apparatus according to claim 9, wherein the subsynchronous resonance damping unit comprises a calculation unit to determine based on damping power set points the damping set points for the damping currents.

12. The electrical generating apparatus according to claim 10, wherein the regulators used to calculate the set points for damping currents can be proportional, proportional integral or proportional integral derivative regulators.

* * * * *